United States Patent [19]

Kagata et al.

[11] Patent Number: 4,538,714

[45] Date of Patent: Sep. 3, 1985

[54] WHEEL HUB CLUTCH ASSEMBLY

[75] Inventors: Tooru Kagata, Toyota; Motoi Fujikawa, Anjo, both of Japan

[73] Assignee: Aisin Seiki Kabushiki Kaisha, Kariya, Japan

[21] Appl. No.: 524,667

[22] Filed: Aug. 19, 1983

[30] Foreign Application Priority Data

Aug. 26, 1982 [JP] Japan ................................. 57-148316

[51] Int. Cl.$^3$ .............................................. F16D 11/04
[52] U.S. Cl. ........................................ 192/54; 192/36; 192/67 R; 192/93 A; 403/1
[58] Field of Search ............... 192/36, 54, 67 R, 93 A; 403/1

[56] References Cited

U.S. PATENT DOCUMENTS 4,281,749 8/1981 Fogelberg .......................... 192/67 R
4,441,597 4/1984 Teraoka ............................. 192/67 R Primary Examiner—Leonard E. Smith
Assistant Examiner—Jane E. Obee
Attorney, Agent, or Firm—Oblon, Fisher, Spivak, McClelland & Maier

[57] ABSTRACT

A wheel hub clutch assembly comprises a cylindrical body formed therein with a first set of clutch teeth and fastened to a wheel hub, a sleeve member fixed to the outer end of a drive axle and located within the body, a clutch member formed with a second set of clutch teeth and axially slidably mounted on the sleeve member for rotation therewith, a cam ring operatively coupled with the outer end of a stationary axle tube for the drive axle and rotatable on the sleeve member, a cam follower ring axially slidably mounted on the sleeve member for rotation therewith and cooperable with the cam ring to be displaced toward the clutch member in response to rotation of the drive axle, and a connecting member engaged with the cam follower ring and the clutch member to permit relatively inward movement between the cam follower ring and clutch member. The improvement comprises a first spring arranged between the cam follower ring and the clutch member for loading the cam follower ring toward the cam ring and cooperable with the connecting member for loading the clutch member for movement away from engagement with the first clutch teeth, and a second spring arranged in parallel with the first spring between the cam follower ring and the clutch member for loading the clutch member for movement toward engagement with the first clutch teeth.

3 Claims, 9 Drawing Figures

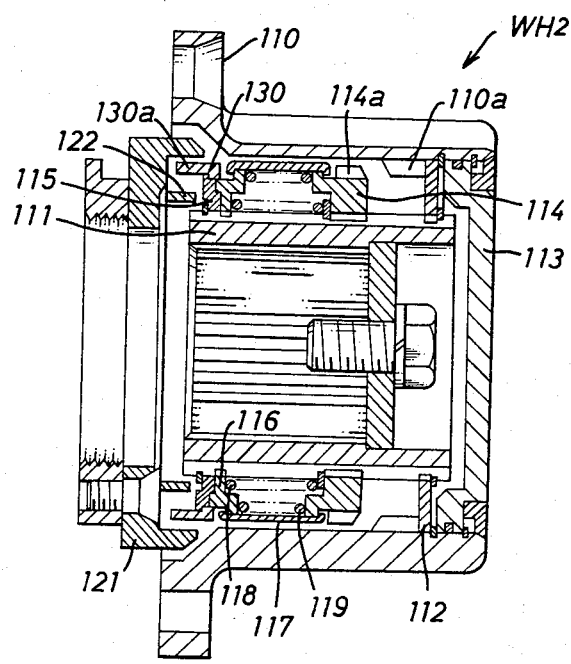
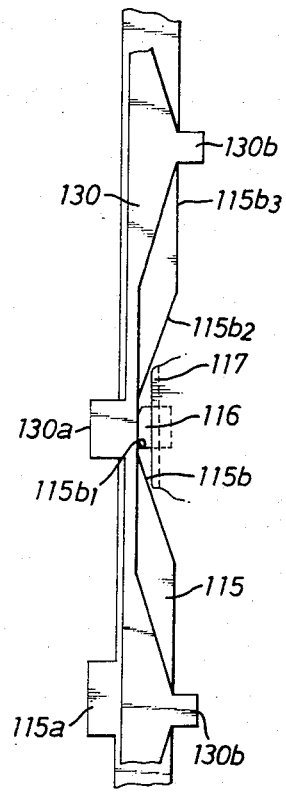
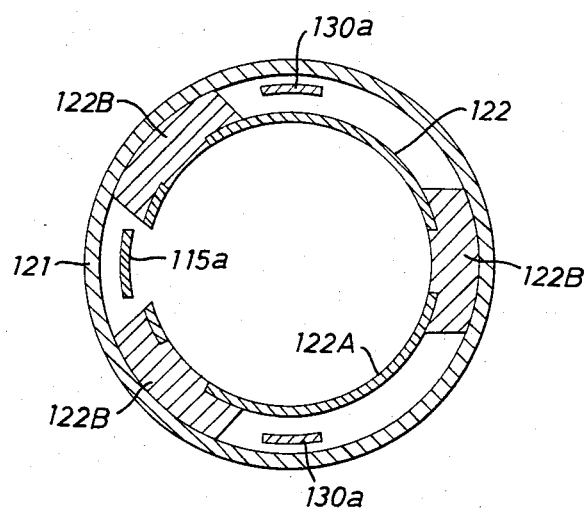

WHEEL HUB CLUTCH ASSEMBLY

BACKGROUND OF THE INVENTION

The present invention relates to a wheel hub clutch assembly adapted for use in a four-wheel drive vehicle, and more particularly to a wheel hub clutch assembly for automatically effecting engagement between a drive axle and a wheel hub in response to rotation of the drive axle.

One of such wheel hub clutch assemblies as described above has been proposed in U.S. Pat. No. 4,281,749 issued on Aug. 4, 1981. As is illustrated in FIG. 9, the wheel hub clutch assembly comprises a cylindrical body C integrally formed therein with a first set of clutch teeth $C_1$ and secured to the outer end $B_1$ of a wheel hub B rotatable on a stationary axle tube A, a sleeve member E fixedly mounted on the outer end of a drive axle D rotatable in axle tube A for rotation therewith, a clutch member F integrally formed with a second set of clutch teeth $F_1$ to be engaged with the first clutch teeth $C_1$ and axially slidably mounted on the sleeve member E for rotation therewith, cam means G operatively coupled with the outer end of axle tube A and rotatable relative to the sleeve member E during rotation of the drive axle D, cam follower means H axially slidably mounted on the sleeve member E for rotation therewith and cooperable with the cam means G to be displaced toward the clutch member F in response to rotation of the drive axle, a connecting member J engaged with the cam follower means H and the clutch member F to permit relatively inward movement between the cam follower means H and the clutch member F, and a spring retainer K secured to the outer end of the drive axle D. The clutch assembly further comprises a first coil spring L interposed between the outer end of connecting member J and the retainer K for biasing the clutch member F inwardly for movement away from engagement with the first clutch teeth $C_1$, and a second coil spring M interposed between the cam follower means H and the clutch member F for biasing the clutch member F outwardly for movement toward engagement with the first clutch teeth $C_1$. With such an arrangement, the movable clutch member F is subjected to a preload by the second coil spring M during rotation of the drive axle. As a result, it is advantageous that in the even clutch engagement is blocked in response to rotation of the drive axle, slight relative rotation between the clutch teeth under the preload relieves the blockage to effect smooth clutch engagement. However, the wheel hub clutch assembly is constructed large in its axial length due to the arrangement of the first and second coil springs L and M in series. For this reason, there is a problem that such a conventional wheel hub clutch assembly may not be mounted within a confined space at the outer end of the drive axle D.

SUMMARY OF THE INVENTION

It is, therefore, a primary object of the present invention to provide an improved wheel hub clutch assembly which will overcome the problem noted above. To solve the problem, the present invention is directed to an improvement of the conventional wheel hub clutch assembly described above, in which a first spring is arranged between the cam follower means and the clutch member for loading the cam follower means toward the cam means and cooperable with the connecting member for loading the clutch member for movement away from engagement with the first clutch teeth, and in which a second spring is arranged in parallel with the first spring between the cam follower means and the clutch member for loading the clutch member for movement toward engagement with the first clutch teeth and cooperable with the connecting member for resiliently providing an axial space between the cam follower means and the clutch member. With such a parallel arrangement of the first and second springs, the wheel hub clutch assembly can be constructed possibly small in its axial length to be mounted within a confined space at the outer end of the drive axle.

BRIEF DESCRIPTION OF THE DRAWINGS

Additional objects and advantages of the present invention will become readily apparent from the following detailed description of preferred embodiments when taken together with the accompanying drawings in which:

FIG. 5 is a sectional view of a second embodiment of the present invention;

FIG. 6 is a cross-sectional view illustrating details of a brake member in the second embodiment;

FIG. 7 is a developed view illustrating in detail relationship among a cam ring, a cam follower ring and an additional ring in the second embodiment;

DETAILED DESCRIPTION OF THE PREFERRED EMBODIMENTS

Figure 1:
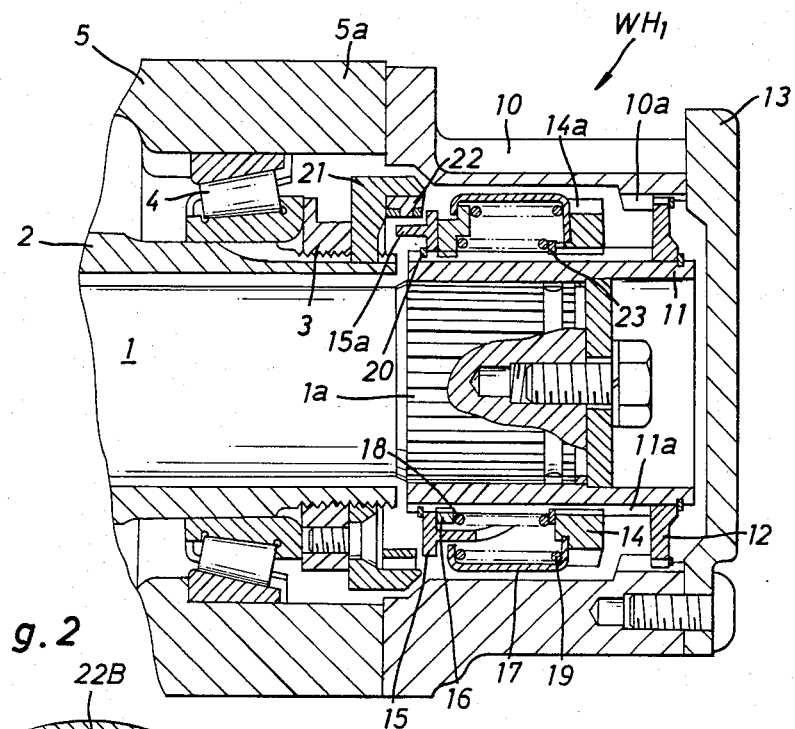
FIG. 1 is a sectional view of an improved wheel hub clutch assembly in accordance with the present invention.

Referring now to the drawings, FIG. 1 illustrates a drive axle 1 of an automotive vehicle of the four-wheel drive type. The axle 1 is rotatably supported in a stationary axle tube or housing 2 and has an external spline 1a at its outer projection. The drive axle 1 is operatively connected at its inner end to a differential gearing (not shown) through a universal joint (not shown), the differential gearing being connected to a prime mover of the vehicle through a transfer mechanism (not shown). Mounted on the outer end of axle tube 2 is a wheel hub 5 which is rotatably supported in place by means of a tapered roller bearing 4. The roller bearing 4 is fastened in place on the outer end of axle tube 2 by means of a lock nut 3. In such an arrangement, the wheel hub 5 is arranged to be operatively connected to the drive axle 1 through a wheel hub clutch assembly $WH_1$ in accordance with the present invention.

The wheel hub clutch assembly $WH_1$ is arranged to effect engagement between the drive axle 1 and the wheel hub 5 in response to rotation of the drive axle 1 under control of the transfer mechanism. The wheel hub clutch assembly WH₁ comprises a cylindrical body 10 secured to the outer end of wheel hub 5, and an inner sleeve member 11 fixedly mounted on the outer projection of axle 1 by means of a spline connection. The cylindrical body 10 is rotatably supported at its outer end by an annular metal bearing 12 which is rotatably supported on sleeve member 11, and a cover plate 14 is secured to the outer end of body 10 to close the interior of body 10.

The cylindrical body 10 is integrally formed at its inner peripheral wall with a first set of clutch teeth 10a in the form of an internal spline. In the interior of body 10, an annular clutch member 14, a cam ring 15, a cam follower ring 16, a cylindrical connecting member 17 and coil springs 18, 19 are assembled on the sleeve member 11. The annular clutch member 14 is integrally-formed at its outer periphery with a second set of clutch teeth 14a in the form of an external spline to be engaged with the first set of clutch teeth 10a in clutching operation. The clutch member 14 has an internal spline in engagement with an external spline 11a of sleeve member 11 for effecting a drive torque transmission between drive axle 1 and wheel hub 5 in the clutching operation. The cam ring 15 is rotatably mounted on the inner end portion of sleeve member 11 and is retained in place by a retainer clip 20. As can be well seen in FIGS. 2-4, the cam ring 15 is integrally formed at its one end face with a pair of axial lugs 15a, 15a each of which extends into the interior of an annular brake member 22. The brake member 22 is assembled within a drum 21 which is mounted on the outer end of axle tube 2 and fastened to lock nut 3 by screws.

The annular brake member 22 is in the form of a spring band 22A which is provided with circumferentially spaced three brake shoes 22B secured thereto. The spring band 22A is formed at its free ends with a pair of lugs 22a, 22a which extend radially to be selectively engaged with the axial lugs 15a, 15a of cam ring 15. The annular brake member 22 is in frictional engagement with the inner periphery of drum 21 to occur a frictional drag force. When one of axial lugs 15a of cam ring 15 abuts against one of radial lugs 22a of spring band 22 in response to rotation of the drive axle 1, the brake member 22 acts to apply a frictional drag force to the cam ring 15 and to cause relative rotation between the cam ring 15 and the cam follower ring 16. The cam ring 15 is further provided at its outer end face with a cylindrical portion 15b which is formed with a root $15b_1$, a pair of rise cam faces $15b_2$, $15b_2$, a pair of flat cam faces $15b_3$, $15b_3$, and a pair of axial projections 15c, 15c to bear a radial projection of cam follower ring 16 thereon.

The cam follower ring 16 is axially slidably mounted on the sleeve member 11 by means of a spline connection and is resiliently engaged with the cylindrical portion 15b of cam ring 15 under load of the coil spring 18. Furthermore, the cam follower ring 16 is coupled with the clutch member 14 by means of the cylindrical connection member 17. The coil spring 18 is in surrounding relationship with the sleeve member 11 and has one end engaged with the cam follower ring 16 and the other end engaged with a retainer clip 23 fixed to an intermediate portion of sleeve member 11. When the drive axle 1 is subjected to rotation under power, the cam follower ring 16 is axially moved by engagement with the cylindrical portion 15b of cam ring 15 against the load of coil spring 18. In such an arrangement, the cylindrical connecting member 17 is arranged to permit relatively inward movement between the cam follower ring 16 and the clutch member 14. The coil spring 19 is arranged in surrounding relationship with the coil spring 18 and housed within the connecting member 17. The coil spring 19 is engaged at one end thereof with the cam follower ring 16 and at the other end thereof with the clutch member 14 through one end of connecting member 17 to resiliently provide an axial space between the cam follower ring 16 and the clutch member 14.

Figure 2:
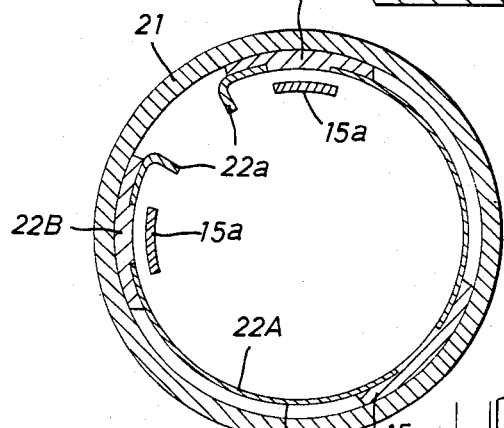
FIG. 2 is a cross-sectional view illustrating details of a brake member in the clutch assembly.
Figure 3:
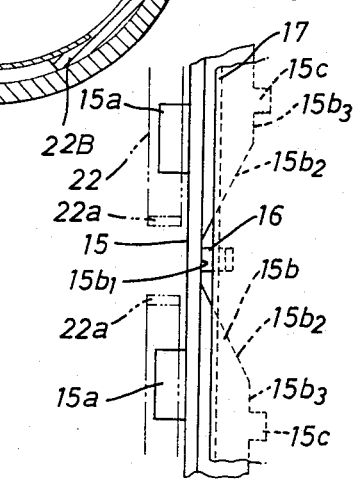
FIG. 3 is a developed view illustrating in detail relationship between a cam ring and a cam follower ring in disengaged position in the clutch assembly.

Hereinafter the operation of the wheel hub clutch assembly WH₁ will be described with reference to FIGS. 1-4. When the drive axle 1 is not subjected to rotation under power, the clutch member 14, cam ring 15 and cam follower ring 16 are in an unlocked position in which the second set of clutch teeth 14a of clutch member 14 are apart from the first set of clutch teeth 10a of cylindrical body 10 to permit free rotation of the wheel hub 5 on axle tube 2 in the two-wheel drive mode. Under such condition, as is illustrated in FIG. 2, the axial lugs 15a, 15a of cam ring 15 are apart from the radial lugs 22a, 22a of brake member 22, and as is illustrated in FIG. 3, the cam follower ring 16 is in engagement with the cylindrical portion 15b of cam ring 15 at root $15b_1$. When the drive axle 1 is subjected to rotation under power in response to operation of the transfer mechanism to provide four-wheel drive, one of axial lugs 15a of cam ring 15 is brought into engagement with one of radial lugs 22a of brake member 22 to apply a frictional drag force to the cam ring 15 so as to cause relative rotation between the cam ring 15 and the cam follower ring 16.

Figure 4:
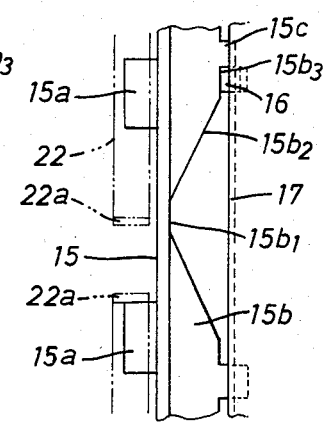
FIG. 4 is a developed view similar to FIG. 3 illustrating relationship between the cam ring and the cam follower ring in engaged position in the clutch assembly.

In such initial operation of the clutch assembly, the follower ring 16 is axially moved against coil spring 18 by engagement with one of the rise cam faces $15b_2$ of cam ring 15 toward the clutch member 14 and is retained in its displaced position by engagement with one of the flat cam faces $15b_3$ of cam ring 15. Thus, the clutch member 14 is displaced outwardly by cam follower ring 16 through coil spring 19, and the second set of clutch teeth 14a are brought into engagement with the first set of clutch teeth 10a of cylindrical body 10. In the event the outward displacement of clutch member 14 is blocked by abutment against the inner end of clutch teeth 10a, compression of coil spring 19 preloads the clutch member 14. Subsequently, slight relative rotation between clutch teeth 10a, 14a relieves the blockage, and the outward displacement of clutch member 14 is completed. Thus, the cylindrical body 10 is operatively connected to the sleeve member 11 to drive the wheel hub 5 on axle tube 2 so as to establish the four-wheel drive. Under such condition, as is illustrated in FIG. 4, the cam follower ring 16 is in engagement with the axial projection 15c of cam ring 15 to rotate therewith.

When the operator desires to establish two-wheel drive, he stops the vehicle and disengages the four-wheel drive under control of the transfer mechanism. The drive axle is no longer subjected to rotation under power. The operator moves the vehicle in the opposite direction slightly to rotate the sleeve member 11 with the wheel hub 5. The cam ring 15 is applied with a frictional drag force in engagement with the brake member 22 to cause relative rotation between the cam follower ring 16 and the cam ring 15. As a result, engagement between the follower ring 16 and the cylindrical portion 15b of cam ring 15 displaces from the flat cam face $15b_3$ to the root $15b_1$ through the rise cam face $15b_2$ under the load of coil spring 18. This causes inward displacement of the clutch member 14 and disengagement of the second set of clutch teeth 14a from the first set of clutch teeth 10a.

In FIGS. 5-7 there is illustrated a second embodiment of the present invention in which an additional ring 130 is rotatably assembled in surrounding relationship with the outer periphery of a cam ring 115, and in which the other component parts 110-114, 116-118, 121, and 122 and the portions thereof are substantially the same as those in the above embodiment. As is illustrated in FIGS. 6 and 7, the additional ring 130 is integrally formed at its inner end with a pair of axial lugs 130a, 130a which extend into a circumferential spaces between the drum 121 and the brake member 122. The additional ring 130 is further formed at its outer end with a pair of axial lugs 130b, 130b which extend outwardly beyond the flat cam face 115b$_3$ of cam ring 115 to be engaged with the cam follower ring 116. When the cam follower ring 116 is brought into engagement with the flat cam face 115b$_3$ of cam ring 115 in the four-wheel drive mode, the additional ring 130 is engaged at its one of axial outer lugs 130b with the cam follower ring 116 to rotate therewith and is subsequently engaged at its one of axial inner lugs 130a with one of the shoes 122B of brake member 122 to tighten radially inwardly the brake band 122A of member 122 thereby to decrease the frictional drag torque acting thereon. This results in decrease of energy loss, defacement of the brake shoes, heat buildup, etc..

Figure 8:
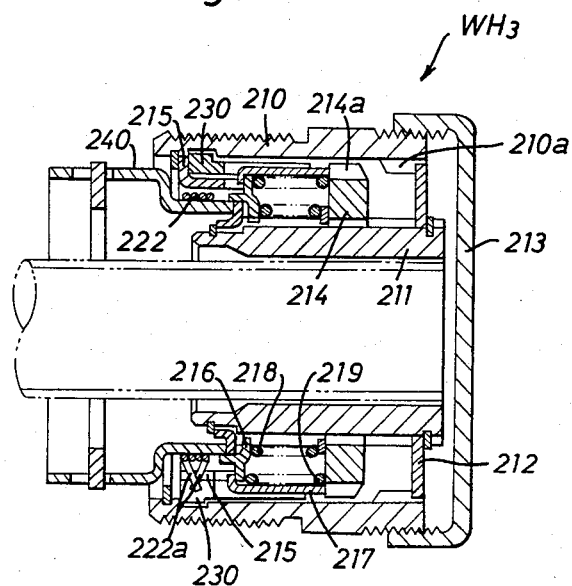
FIG. 8 is a sectional view of a third embodiment of the present invention.
Figure 9:
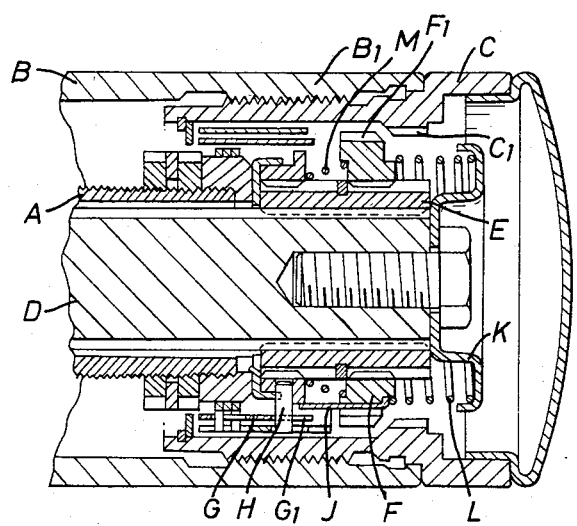
FIG. 9 is a sectional view of a conventional wheel hub clutch assembly.

In FIG. 8 there is illustrated a third embodiment of the present invention which includes a sleeve member 240 secured to the axle tube (not shown), a cam ring 215 rotatably coupled with the inner peripheral wall of a cylindrical body 210 and operatively engaged with a cam follower ring 216, and a coil spring 222 wrapped around the outer periphery of sleeve member 240 in such a manner that some frictional drag force is developed therebetween. The coil spring 222 has opposite ends 222a, 222a respectively extending radially outwardly and engageable with the cam ring 215 and an additional ring 230. When engaged with one of radial ends 222a of spring 222 in response to rotation of an inner sleeve member 211 in the four-wheel drive mode, the cam ring 215 is applied with the frictional drag force to cause relative rotation between the cam follower ring 216 and the cam ring 215, and subsequently the additional ring 230 is brought into engagement with the other end 222a of spring 222 to loose or unwrap the spring 222 around sleeve member 240 thereby to decrease the frictional drag force acting on the cam ring 215. The other component parts 210-214, and 217-219, and portions thereof are substantially the same as those in the embodiment of FIG. 1.

Although each cam ring (15, 115 or 215) in the above embodiments is applied with a frictional drag force by engagement with its asscciated brake member in response to rotation of the drive axle to effect axial displacement of its associated follower ring toward the clutch member, the cam ring may be fixed to the outer end of the axle tube to effect axial displacement of its associated follower ring toward the clutch member in response to rotation of the drive axle. Alternatively, the internal spline (10a, 110a or 210a) may be replaced with a first set of radial clutch teeth formed on the inner end wall of cylindrical body (10, 110 or 210), while the external spline (14a, 114a or 214a) may be replaced with a second set of radial clutch teeth formed on the outer end of clutch member (14, 114 or 214) to be engaged with the first set of radial clutch teeth. It is also noted that each coil spring in the above embodiments may be replaced with a volute spring. Although in the above embodiments, the outer coil spring (19, 119 or 219) is arranged in surrounding relationship with the inner coil spring (18, 118 or 218), the inner coil spring may be replaced with a first set of circumferentially equispaced coil springs in surrounding relationship with the inner sleeve member (11, 111 or 211), and the outer coil spring may be replaced with a second set of circumferentially equispaced coil springs which are respectively arranged in parallel between the first set of coil springs.

The forgoing description presents the preferred embodiments of the present invention. Modifications and alterations may occur to those skilled in the art which will come within the scope and spirit of the following claims.

What is claimed is:

1. A wheel hub clutch assembly for effecting engagement between a drive axle and a wheel hub in response to rotation of said drive axle, comprising a cylindrical body integrally formed therein with a first clutch element and to be fastened to the outer end of said wheel hub, a sleeve member fixedly mounted on the outer end of said drive axle for rotation therewith and located within said cylindrical body, a clutch member integrally formed with a second clutch element to be engaged with said first clutch element and axially slidably mounted on said sleeve member for rotation therewith, cam means operatively coupled with the outer end of a stationary axle tube for said drive axle and rotatable on said sleeve member, cam follower means axially slidably mounted on said sleeve member for rotation therewith and cooperable with said cam means to be displaced toward said clutch member in response to rotation of said drive axle, and a connecting member engaged with said cam follower means and said clutch member to permit relatively inward movement between said cam follower means and said clutch member, wherein the improvement comprises:
  a first spring arranged between said cam follower means and said clutch member for loading said cam follower means toward said cam means and cooperable with said connecting member for loading said clutch member for movement away from engagement with said first clutch element; and
  a second spring arranged in parallel with said first spring between said cam follower means and said clutch member for loading said clutch member for movement toward engagement with said first clutch element and cooperable with said connecting member for resiliently providing an axial space between said cam follower means and said clutch member.

2. A wheel hub clutch assembly as claimed in claim 1, wherein said first spring is in the form of a first coil spring in surrounding relationship with said sleeve member and being engaged at one end thereof with said cam follower means and at the other end thereof with said sleeve member, and wherein said second spring is in the form of a second coil spring in surrounding relationship with said first coil spring and being engaged at the opposite ends thereof with said cam follower means and said clutch member with a preload.

3. A wheel hub clutch assembly as claimed in claim 2, wherein said connecting member is in the form of a cylindrical member, and wherein both said first and second coil springs are housed within said cylindrical connecting member.

* * * * *